US012083785B2

(12) United States Patent
Quaglia

(10) Patent No.: US 12,083,785 B2
(45) Date of Patent: Sep. 10, 2024

(54) SQUEEGEE ASSEMBLY FOR SCREEN PRINTING, SCREEN PRINTING MACHINE AND SCREEN PRINTING METHOD

(71) Applicant: QUAGLIA S.R.L., Azzano San Paolo (IT)

(72) Inventor: Giuseppe Quaglia, Azzano San Paolo (IT)

(73) Assignee: QUAGLIA S.R.L., Bergamo (IT)

( * ) Notice: Subject to any disclaimer, the term of this patent is extended or adjusted under 35 U.S.C. 154(b) by 0 days.

(21) Appl. No.: 17/792,690

(22) PCT Filed: Jan. 14, 2021

(86) PCT No.: PCT/IB2021/050258
§ 371 (c)(1),
(2) Date: Jul. 13, 2022

(87) PCT Pub. No.: WO2021/144735
PCT Pub. Date: Jul. 22, 2021

(65) Prior Publication Data

US 2023/0041731 A1 Feb. 9, 2023

(30) Foreign Application Priority Data

Jan. 16, 2020 (IT) ........................ 102020000000733

(51) Int. Cl.
*B41F 15/46* (2006.01)

(52) U.S. Cl.
CPC .................................... *B41F 15/46* (2013.01)

(58) Field of Classification Search
CPC ................................. B41F 15/44; B41F 15/46
See application file for complete search history.

(56) References Cited

U.S. PATENT DOCUMENTS 4,841,854 A 6/1989 Bubley
5,680,814 A * 10/1997 Lautzenhiser ....... H05K 3/1233 101/124
2009/0158943 A1* 6/2009 Kobayashi .............. B41F 15/46 101/129

FOREIGN PATENT DOCUMENTS

CN 207310800 U 5/2018
JP 2001196732 A 7/2001
(Continued)

OTHER PUBLICATIONS

EPO Machine translation of JP 2001196732 (Year: 2001).*
(Continued)

*Primary Examiner* — Jennifer Bahls
*Assistant Examiner* — Quang X Nguyen
(74) *Attorney, Agent, or Firm* — Ferguson Case Orr Paterson

(57) ABSTRACT

A squeegee assembly for a screen printing machine has a squeegee support body having a side configured to be fastened to the screen printing machine, a front portion provided with a front element and a rear portion provided with a rear element, respectively having a front element printing end and a rear element printing end for screen printing by ink. The front element printing end is spaced apart with respect to the rear element printing end in a translation direction so that an ink collection space is formed therebetween. In the front portion, one or more ink passage openings are formed for allowing passage of ink from a region in front of the front element towards the ink collection space during translation of the squeegee assembly during screen printing. Ink in the ink collection space is draggable by the rear element during translation of the squeegee assembly.

13 Claims, 5 Drawing Sheets

(56) References Cited

FOREIGN PATENT DOCUMENTS

| | | | | |
|---|---|---|---|---|
| JP | 2005343116 | A | | 12/2005 |
| TW | M306899 | U | * | 3/2007 |
| TW | 200815196 | A | | 4/2008 |

OTHER PUBLICATIONS

Ropean Patent Office, International Search Report issued in PCT/IB2021/050258, mailed May 17, 2021, Rijswijk, NL.

Ropean Patent Office, International Written Opinion issued in PCT/IB2021/050258, mailed May 17, 2021, Rijswijk, NL.

Office Action Issued in Chinese Application No. 202180009701.X; Issue Date Sep. 28, 2023.

* cited by examiner

SQUEEGEE ASSEMBLY FOR SCREEN PRINTING, SCREEN PRINTING MACHINE AND SCREEN PRINTING METHOD

The present invention belongs, in general, to the field of screen printing.

More in particular, the present invention relates to a squeegee assembly for screen printing, to a screen printing machine and to a screen printing method.

In the field of screen printing, a printing head, provided with a squeegee, by means of a translation movement, transfers the ink onto a substrate to be printed, for example, onto a T-shirt, by means of a screen printing mesh mounted on a screen printing frame on which the squeegee exerts a pressure which is as uniform as possible.

In the field of screen printing, it is known that printing by using inks with chemical solvents is facilitated by the intrinsic property of such inks to pass more easily through the matrix of the screen printing mesh.

In the case of ecological, new generation, water-based inks, such ink permeability through the fabric mesh is very low, due to the different thixotropic properties.

Therefore, screen printing employing the aforesaid water-based inks requires that at least two strokes of the printing head be performed on the screen printing mesh to ensure the same printing quality of a corresponding ink with solvent, which requires only one printing stroke.

Unfortunately, therefore, the use of water-based inks causes an increase in printing times and production efficiency.

It is the object of the present invention to solve the aforesaid drawbacks of the known screen printing methods which employ water-based inks. In particular, it is one of the objects of the present invention to achieve a squeegee assembly for screen printing, a screen printing machine and a screen printing method which are capable of reducing printing times and of increasing production efficiency also for the types of ink with a reduced ability to pass through the matrix of the screen printing mesh.

In accordance with the invention, such objects are achieved by a squeegee assembly for screen printing, a screen printing machine and a screen printing method in accordance with the appended independent claims. Preferred embodiments of the invention are defined in the dependent claims.

The features and advantages of the squeegee assembly for screen printing, of the screen printing machine and of the screen printing method, will become apparent from the following description, given by way of explanation and not by way of limitation, in accordance with the accompanying Figures, in which.

Figure 1:
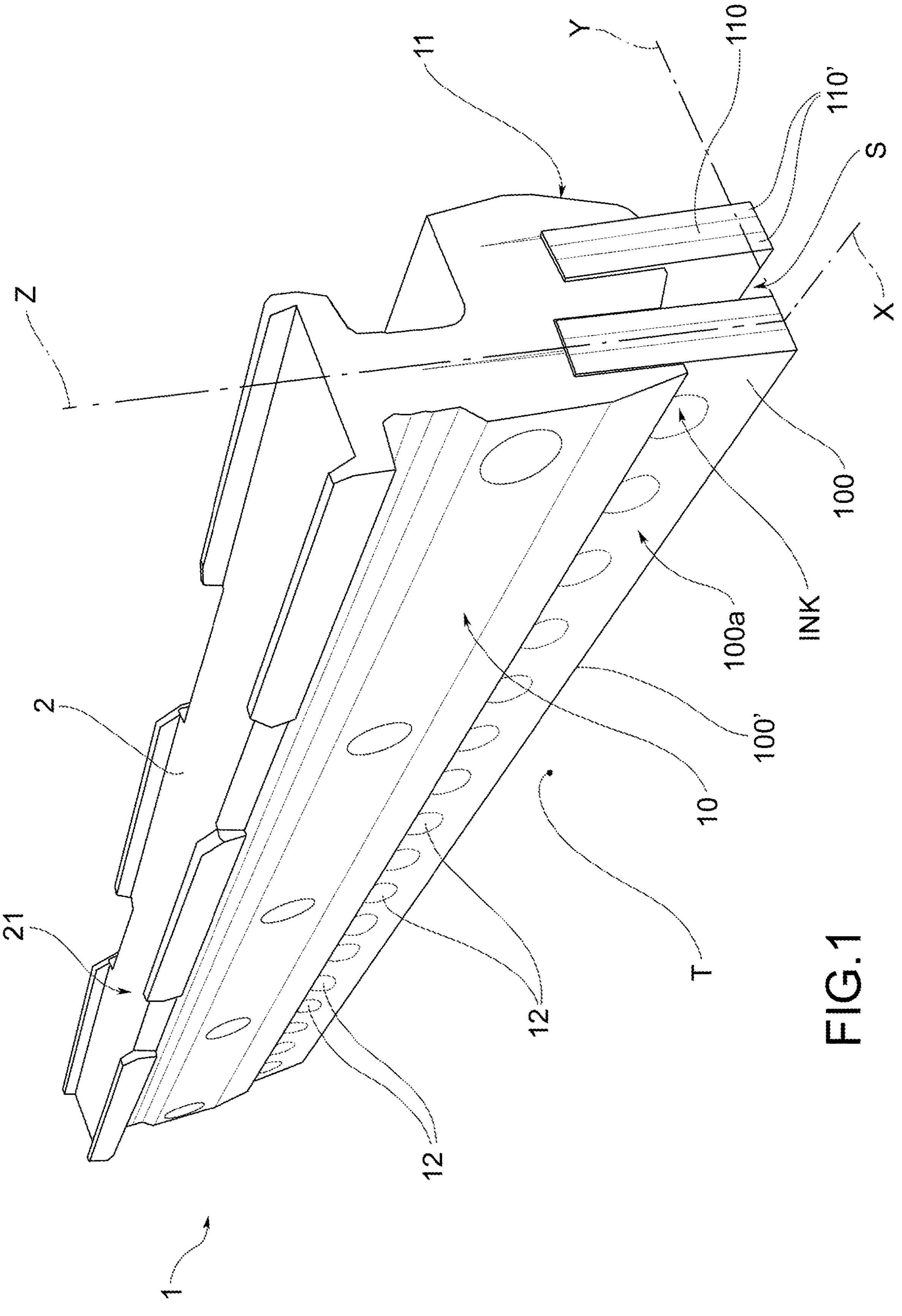
FIG. 1 shows a perspective view of a squeegee assembly according to an embodiment of the present invention.

In accordance with the accompanying Figures, reference numeral 1 overall indicates a squeegee assembly 1 for a screen printing machine. It is clear that the present invention also relates to a screen printing machine, although not shown, comprising such squeegee assembly 1.

The squeegee assembly 1 comprising a squeegee support body 2, also called squeezer, comprising a side 21 adapted to be fastened to the screen printing machine.

Furthermore, the squeegee assembly 1 comprises a front portion 10 comprising an elastically deformable front element 100 and a rear portion 11 comprising an elastically deformable rear element 110. Such front element 100 and rear element 110 are properly known in the field with the term squeegee, and preferably have a laminar shape adapted to press on the screen printing mesh.

Preferably, the front element 100 and/or the rear element 110 are made of a polymeric material, for example, a synthetic rubber, or of a silicone material or a polyurethane material, possibly multilayer.

The front portion 10 and the rear portion 11 are supported by the squeegee support body 2, and preferably protrude therefrom.

The front element 100 and the rear element 110 mainly extend in length along a longitudinal direction X and in height along a vertical direction Z.

The front element 100 has a front element printing end 100' and the rear element 110 has a rear element printing end 110'. Both printing ends 100' and 110' are adapted to be translated in a translation direction Y, incident to the longitudinal direction X and the vertical direction Z, and to be pressed against a screen printing mesh T for screen printing by means of ink. In other words, the printing ends 100',110' are edges which are dragged under pressure on the screen printing mesh to transfer the ink on the substrate to be printed, for example, on a T-shirt, by means of the passage into the screen printing mesh, which acts as a mask.

The front element printing end 100' is spaced apart with respect to the rear element printing end 110' in a direction incident to the longitudinal direction X and to the vertical direction Y, i.e. it is spaced apart in the translation direction Z, which is preferably perpendicular to both the longitudinal direction X and to the vertical direction Y.

Between the front element printing end 100' and the rear element printing end 110' there is therefore an ink collection space S precisely due to the fact that such printing ends 100',110' are spaced apart, i.e., they are arranged one in front of the other. Thereby, a double squeegee is formed, i.e., a squeegee equipped with two blades spaced apart from each other in the translation direction Y.

The ink collection space S is therefore open towards the screen printing mesh.

The front element 100 has a front face 100*a* and a rear face 100*b* opposite to the front face 100*a*. Such rear face 100*b* is arranged on the side of the ink collection space S, i.e., it faces towards the ink collection space S.

Figure 5:
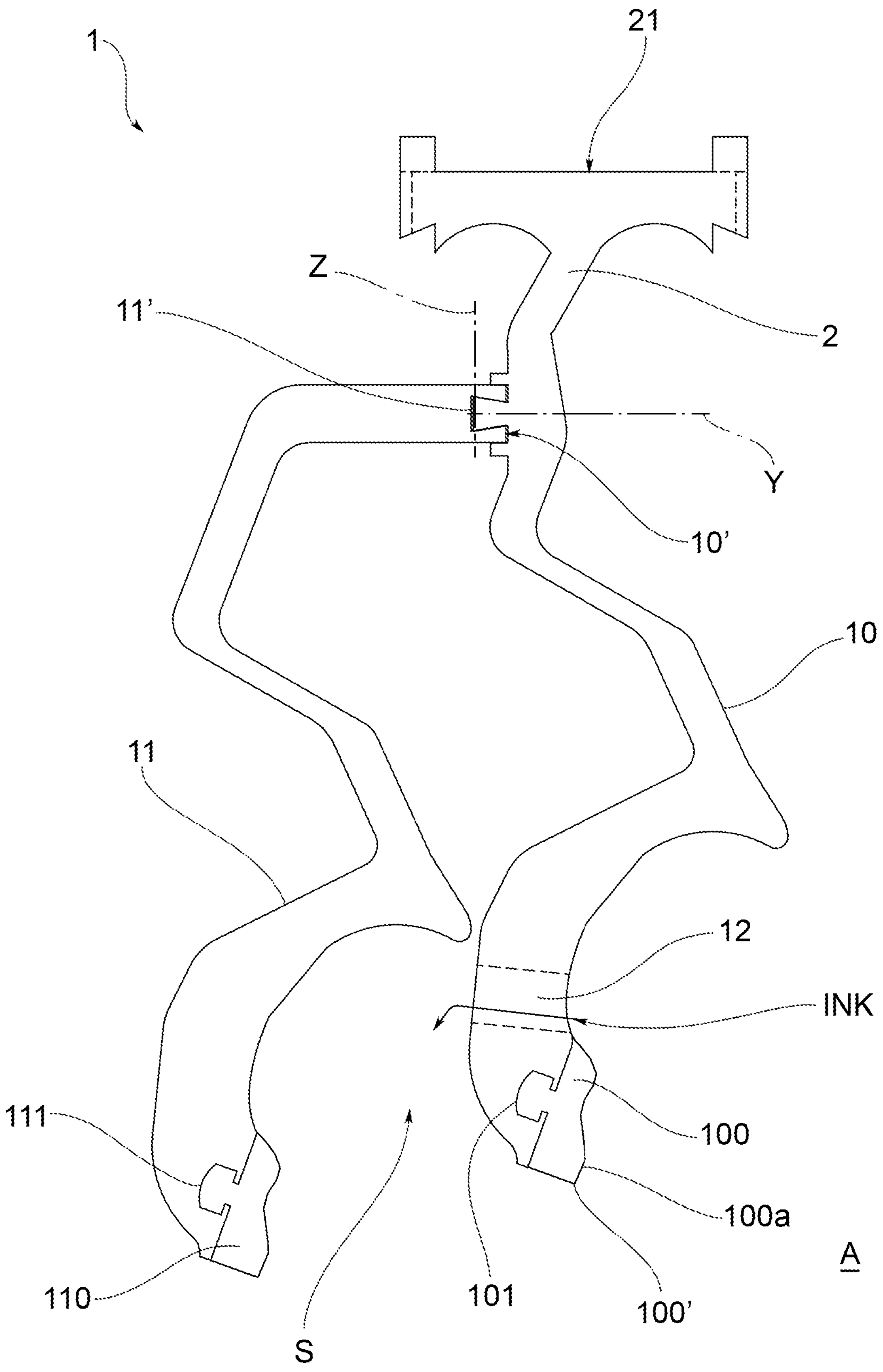
FIG. 5 shows a side plan view of a squeegee assembly according to an embodiment of the present invention.

In the front portion 10, one or more ink passage openings 12 are obtained, adapted to allow the passage of the ink from a region A in front of the front element 100, i.e., on the side of the front face 100*a*, towards the ink collection space S. This occurs during the translation of the squeegee assembly 1 in the translation direction Y during the screen printing step, so that the ink resulting in the ink collection space S may be, in turn, dragged by the rear element 110 during the step itself of translating the squeegee assembly 1. The effect of this is the fact that in a single translation operation, the ink is squeezed onto the screen printing mesh, a first time by the front element 100 and a second time by the rear element 110, generating an effect which is equivalent to a double stroke, but without the need to reposition new ink on the screen printing mesh. In fact, the ink necessary for the rear element 110 is already present and ready in the ink collection space S, by virtue of the passage through the ink passage openings 12 obtained in the front portion. In FIG. 1 and FIG. 5, the arrow INK indicates the movement of passage which the ink performs from the region A in front of the ink collection space S during the step of translating the squeegee group in the translation direction Y.

According to an embodiment, the rear portion 11 may be entirely made of an elastically deformable material and be joined to the front portion 10 and/or to the front element 100.

In accordance with an embodiment, the front portion 10 and the rear portion 11 are each a rigid element, preferably made of metallic material, for example a metal section, substantially non-deformable during the screen printing operation. The front portion 10 and the rear portion 11 respectively comprise a front portion seat 101 and a rear portion seat 111. The elastically deformable front element 100 is fastened in the front portion seat 101 and the elastically deformable rear element 110 is accommodated in the rear portion seat 111. Elastically deformable means that it is deformable in order to perform a correct screen printing operation by means of pressure on the screen printing mesh.

Preferably, therefore, the ink passage openings 12 are openings passing through the front portion 10 and/or the front element 100.

Figure 3:
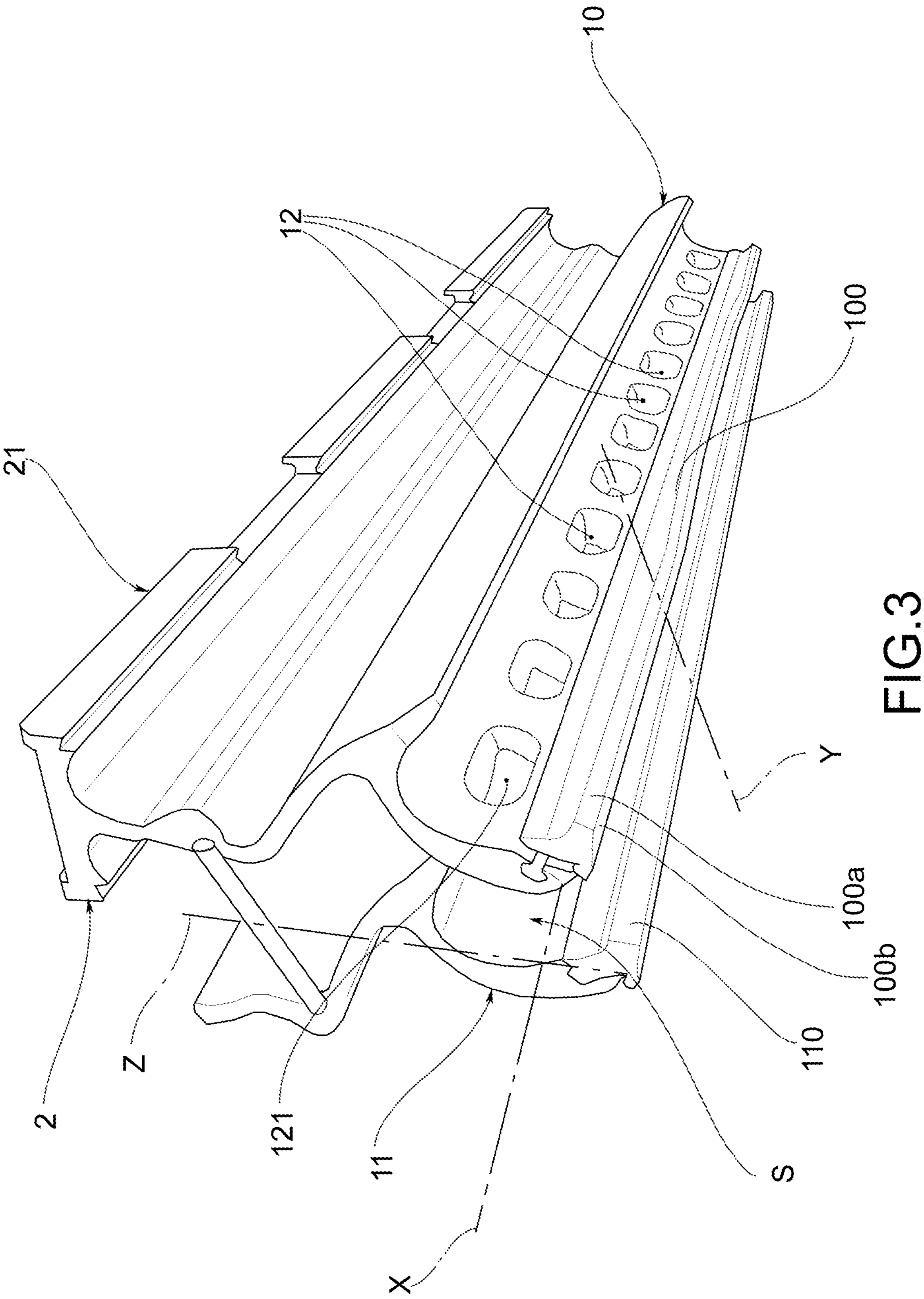
FIG. 3 shows a perspective view of a squeegee assembly according to another embodiment of the present invention.
Figure 4:
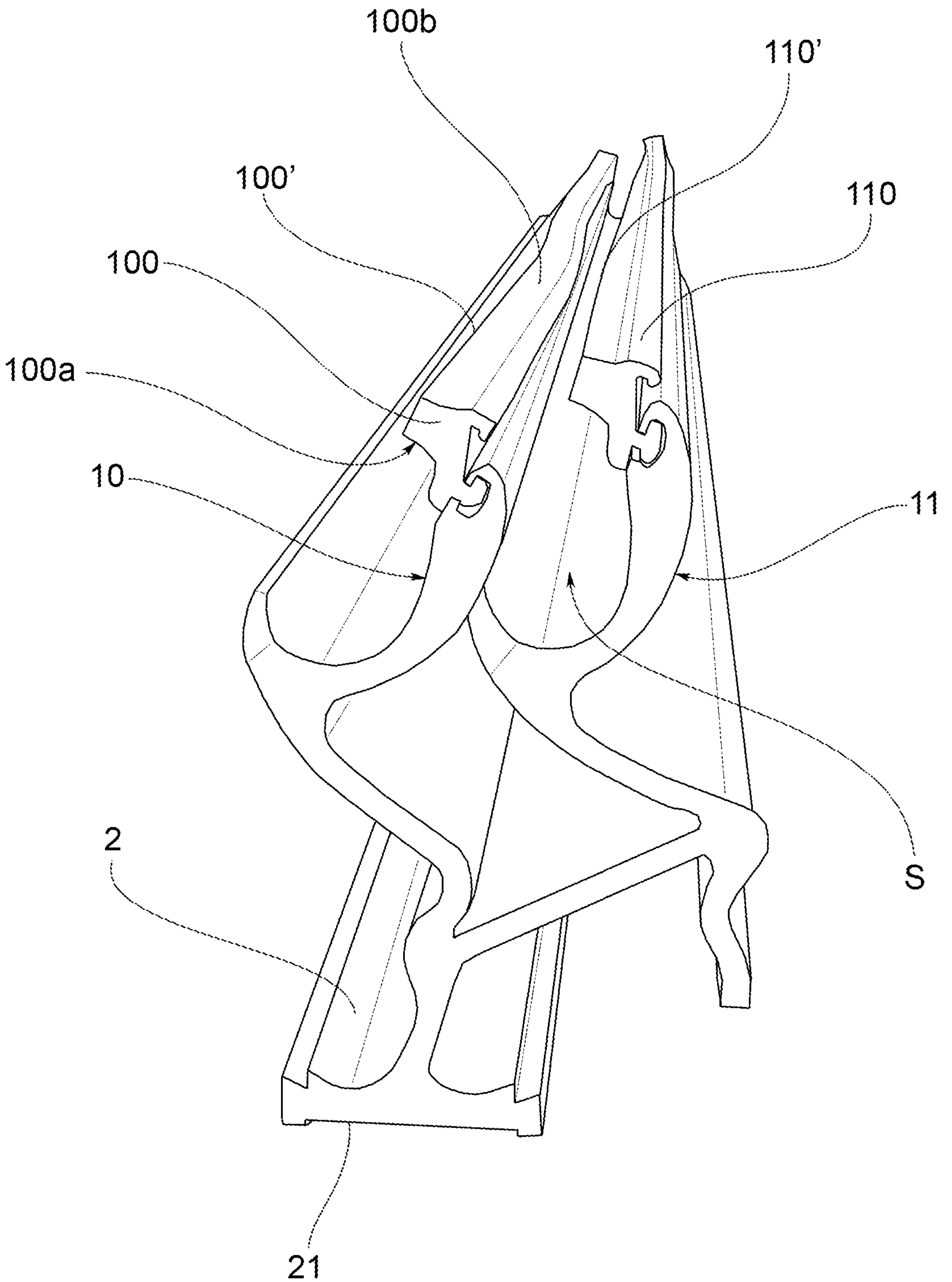
FIG. 4 shows a further view of the squeegee assembly of FIG. 3, with the printing ends facing upwards for clarity of representation.

According to an embodiment, one or more ink passage openings 12 are obtained in the front portion 10, but the front element 100 is devoid of ink passage openings, as shown, for example, in FIGS. 3 to 5.

Figure 2:
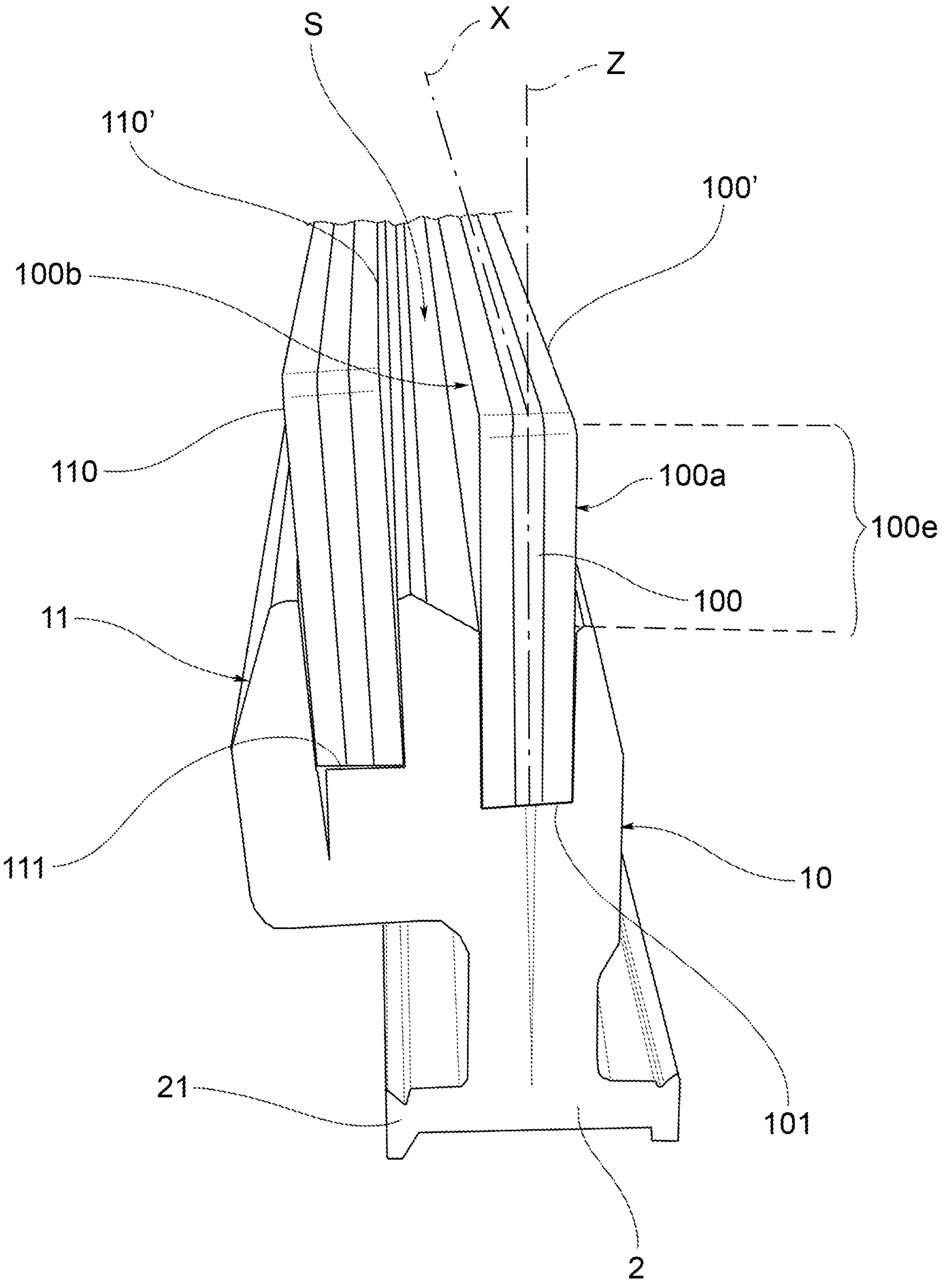
FIG. 2 shows a further view of the squeegee assembly of FIG. 1, with the printing ends facing upwards for clarity of representation.

According to another embodiment variant, the one or more ink passage openings 12 are obtained only in the front element 100, as shown, for example, in FIGS. 1 and 2. In other words, in this variant, the ink passage openings 12 are directly obtained in the elastically deformable front element 100.

The ink passage openings 12 are preferably holes spaced apart from each other along the longitudinal direction X, preferably positioned substantially along the entire length of the front portion 10 or in any case for an extension greater than half the length of the front portion 10.

According to an embodiment variant, not shown, the one or more ink passage openings 12 are obtained both in the front element 100 as well as in the front portion 10 made of non-deformable metallic material.

Preferably, the rear portion 11 and the rear element 110 are devoid of ink passage openings.

Preferably, the one or more ink passage openings 12 are obtained close to the front element printing end 100'; preferably, this is accomplished such that an opening wall 121 closer to the front element printing end 100' is spaced apart from said front element printing end 100' by, at most, about three centimeters in the vertical direction Z, even more preferably, by at most two centimeters.

In accordance with an embodiment, the front element 100 comprises an emerging portion 100*e* which protrudes from the front portion seat 101 and is not surrounded by the front portion 10. In such emerging portion 100*e*, the ink passage openings 12 are obtained.

According to an advantageous embodiment variant, for example, shown both in FIG. 1 and in FIG. 5, the front portion 10 is separable from the rear portion 11, so as to allow the cleaning of the squeegee assembly 1 or the replacement of the front element 100 or rear element 110.

Preferably, for example, as shown in FIG. 5, the rear portion 11 comprises a rear fastening seat 11' and the front portion 10 comprises a front fastening seat 10' adapted to be coupled, according to a shape coupling, with the rear fastening seat 11'. Thereby, the front portion 10 and the rear portion 11 are joined to each other so as to be separable from each other along the longitudinal direction X, but, at the same time, so as to be constrained to each other in the vertical direction Z and in the translation direction Y. This allows rapid separability between the front and the rear portion by means of a simple and rapid translation movement along the longitudinal direction X.

In particular, preferably, the rear fastening seat 11' and the front fastening seat 10' together form a coupling of the dovetail type.

It is also an object of the present invention a method for screen printing on a substrate to be printed, such as a T-shirt, which uses a squeegee assembly described up to now.

The method comprises, in the order indicated, the steps of:

a) providing a screen printing mesh;
b) placing the ink on the screen printing mesh;
c) translating the squeegee assembly 1 previously described only once along the translation direction Y by means of pressure against the screen printing mesh, so as to obtain the screen print on the substrate, i.e., to perform a single stroke.

Preferably, the method provides that the ink is an ecological water-based ink.

In particular, the method provides that during the translation of the squeegee assembly 1 no further ink is introduced into the ink collection space with respect to the ink placed during step b), but the resulting ink in the ink collection space is only obtained by the passage of the ink through the ink passage openings 12.

Innovatively, the squeegee assembly according to the present invention allows to increase the production efficiency for screen printing even for the types of ink with reduced ability to pass through the matrix of the screen printing mesh, such as ecological water-based inks.

In particular, by virtue of the presence of the ink passage openings, it is not necessary to perform a second printing stroke, as in conventional screen printing techniques. In fact, the ink passage openings transfer the ink to the rear portion already during the single first stroke and the rear portion has enough ink to actually perform the second stroke.

It should be emphasized that without such ink passage openings 12, a squeegee assembly still having a front element and a rear element would not solve the technical issue solved by the present invention, since the rear element would not have enough ink to continue the printing.

Before achieving the present invention, the inventor tried numerous different solutions to improve the printing, trying both to vary the properties of the mesh of the screen printing mesh as well as to modify the mechanical properties of the elastically deformable elements, but without obtaining satisfactory results.

The same inventor has also tried to provide means for facilitating the entry of ink into the ink collection space between the front element and the rear element, for example, by means of side panels or a system for injecting ink from above. However, all of the aforesaid solutions turned out to be too complex and not working.

Therefore, surprisingly, the presence of openings directly obtained on the front portion, or in any case directly on the elastically deformable front element, proved to be a simple, effective solution capable of increasing screen printing production efficiency.

Furthermore, advantageously, the possibility of separating the front portion and the rear portion from each other in a rapid manner allows for an easy maintenance of the squeegee assembly both for cleaning and for replacing the elastically deformable front or rear elements.

In order to meet contingent needs, it is apparent that those skilled in the art may make changes to the invention described above, all of which are contained within the scope of protection as defined in the following claims.

The invention claimed is:

1. A squeegee assembly for a screen printing machine comprising:

a squeegee support body, comprising a side configured to be fastened to the screen printing machine, a front portion comprising an elastically deformable front element and a rear portion comprising an elastically deformable rear element, the elastically deformable front element and the elastically deformable rear element being both deformable to perform a correct screen printing operation by means of pressure on a screen printing mesh, said front portion and rear portion being supported by the squeegee support body, the elastically deformable front and rear elements mainly extending in length along a longitudinal direction and in height along a vertical direction, and comprising a front element printing end and a rear element printing end, respectively, the front element printing end and the rear element printing end being configured to be translated in a translation direction incident to the longitudinal direction and the vertical direction and pressed against a screen printing mesh for screen printing by ink;

wherein the front element printing end is spaced apart with respect to the rear element printing end in a direction incident to the longitudinal direction and to the vertical direction, i.e. in the translation direction, wherein between the front element printing end and the rear element printing end an ink collection space is formed, wherein the elastically deformable front element comprises a front face and a rear face opposite to the front face, said rear face facing the ink collection space, and wherein in the front portion, one or more ink passage openings are formed, configured to allow passage of the ink from a region in front of the elastically deformable front element, namely on a side of the front face, towards the ink collection space, during translation of the squeegee assembly the in translation direction during screen printing, so that the ink resulting in the ink collection space is draggable by the elastically deformable rear element during translation of the squeegee assembly.

2. The squeegee assembly of claim 1, wherein the front portion and the rear portion are each a rigid element, substantially non-deformable during screen printing, respectively comprising a front portion seat and a rear portion seat, the elastically deformable front element being fastened in the front portion seat and the elastically deformable rear element being accommodated in the rear portion seat.

3. The squeegee assembly of claim 2, wherein the one or more ink passage openings are formed in the front portion, and the elastically deformable front element is devoid of ink passage openings.

4. The squeegee assembly of claim 2, wherein the one or more ink passage openings are formed only in the elastically deformable front element.

5. The squeegee assembly of claim 2, wherein the elastically deformable front element comprises an emerging portion that protrudes from the front portion seat and is not surrounded by the front portion, the one or more ink passage openings being formed in the emerging portion.

6. The squeegee assembly of claim 2, wherein the front portion is separable from the rear portion to allow cleaning of the squeegee assembly or replacement of the elastically deformable front element or of the elastically deformable rear element.

7. The squeegee assembly of claim 6, wherein the rear portion comprises a rear fastening seat and the front portion comprises a front fastening seat configured to be coupled, by shape coupling, with the rear fastening seat to keep the front portion and the rear portion joined to each other so as to be separable from each other along the longitudinal direction and constrained to each other in the vertical direction and in the translation direction.

8. The squeegee assembly of claim 7, wherein the rear fastening seat and the front fastening sea together form a dovetail type coupling.

9. The squeegee assembly of claim 2, wherein said rigid element is made of metallic material.

10. The squeegee assembly of claim 1, wherein the rear portion and the elastically deformable rear element are devoid of ink passage openings.

11. The squeegee assembly of claim 1, wherein the one or more ink passage openings are formed close to the front element printing end, so that an opening wall closer to the front element printing end is spaced apart from said front element printing end by, at most, about 3 centimeters in the vertical direction.

12. A screen printing machine comprising the squeegee assembly of claim 1.

13. A method for screen printing on a substrate to be printed, said method comprising:

providing a screen printing mesh;

placing ink on the screen printing mesh;

translating a squeegee assembly for a screen printing machine comprising:

a squeegee support body, comprising a side configured to be fastened to the screen printing machine, a front portion comprising an elastically deformable front element and a rear portion comprising an elastically deformable rear element, said front portion and rear portion being supported by the squeegee support body, the elastically deformable front and rear elements mainly extending in length along a longitudinal direction and in height along a vertical direction, and comprising a front element printing end and a rear element printing end, respectively, the front element printing end and the rear element printing end being configured to be translated in a translation direction incident to the longitudinal direction and the vertical direction and pressed against a screen printing mesh for screen printing by ink;

wherein the front element printing end is spaced apart with respect to the rear element printing end in a direction incident to the longitudinal direction and to the vertical direction, i.e. in the translation direction, wherein between the front element printing end and the rear element printing end an ink collection space is formed, wherein the elastically deformable front element comprises a front face and a rear face opposite to the front face, said rear face facing the ink collection space, and wherein, in the front portion, one or more ink passage openings are formed, configured to allow passage of the ink from a region in front of the elastically deformable front element, namely on a side of the front face, towards the ink collection space, during translation of the squeegee assembly in the translation direction during screen printing, so that the ink resulting in the ink collection space is draggable by the elastically deformable rear element during translation of the squeegee assembly, only once, performing a single stroke along the translation direction by pressure against the screen printing mesh to obtain a screen print on the substrate.

* * * * *